United States Patent [19]

Masuda

[11] Patent Number: 5,660,152
[45] Date of Patent: Aug. 26, 1997

[54] EXHAUST CONTROL VALVE FOR ENGINE

[75] Inventor: Tatsuyuki Masuda, Iwata, Japan

[73] Assignee: Yamaha Hatsudoki Kabushiki Kaisha, Iwata, Japan

[21] Appl. No.: 633,903

[22] Filed: Apr. 17, 1996

[30] Foreign Application Priority Data

Apr. 17, 1995 [JP] Japan .................................. 7-115109

[51] Int. Cl.$^6$ .................................................. F02B 27/02
[52] U.S. Cl. ............................................................ 123/65 PE
[58] Field of Search .......................... 123/65 PE, 65 P, 123/65 EM; 60/314

[56] References Cited

U.S. PATENT DOCUMENTS

| | | | |
|---|---|---|---|
| 4,121,552 | 10/1978 | Mithuo et al. | 123/65 PE |
| 4,388,894 | 6/1983 | Tanaka | 123/65 PE |
| 4,522,029 | 6/1985 | Tomita et al. | 60/314 |
| 4,630,446 | 12/1986 | Iwai et al. | 60/314 |
| 4,732,124 | 3/1988 | Nakamura et al. | 60/314 |
| 4,766,854 | 8/1988 | Riese | 123/65 PE |
| 4,805,571 | 2/1989 | Humphrey | 123/316 |
| 5,209,192 | 5/1993 | Ahmed et al. | 123/65 PE |
| 5,410,993 | 5/1995 | Masuda et al. | 123/65 PE |
| 5,537,958 | 7/1996 | Nishimura et al. | 123/65 PE |

FOREIGN PATENT DOCUMENTS

| | | |
|---|---|---|
| 0205415 | 12/1986 | European Pat. Off. . |
| 0479342 | 4/1992 | European Pat. Off. . |
| 0578373 | 1/1994 | European Pat. Off. . |
| 0603914 | 6/1994 | European Pat. Off. . |
| 3933105 | 4/1990 | Germany ............... 123/65 PE |
| 57-68508 | 4/1982 | Japan ................. 123/65 PE |
| 62-32219 | 2/1987 | Japan ................. 123/65 EM |
| 62-35024 | 2/1987 | Japan ................. 123/65 PE |
| 2-204625 | 8/1990 | Japan ................. 123/65 PE |
| 2-207131 | 8/1990 | Japan ................. 123/65 PE |
| 3-149316 | 6/1991 | Japan ................. 123/65 PE |

*Primary Examiner*—David A. Okonsky
*Attorney, Agent, or Firm*—Knobbe, Martens, Olson & Bear LLP

[57] ABSTRACT

Several embodiments of two-cycle internal combustion engines having exhaust control valves that include butterfly-type valves for minimizing the likelihood of sticking and reducing the area where deposits could form that would interfere with the valve operation. The butterfly-type valves are journaled in a separate valve housing that is mounted in a transversely extending bore that extends through the cylinder block of the engine for facilitating servicing.

20 Claims, 9 Drawing Sheets

EXHAUST CONTROL VALVE FOR ENGINE

BACKGROUND OF THE INVENTION

This invention relates to an exhaust control valve for an engine and more particularly to an improved engine compression exhaust control valve.

In a wide variety of types of internal combustion engines and, particularly, two-cycle engines, it has been the practice to provide an exhaust control valve for controlling the effective compression ratio of the engine. These exhaust control valves can be utilized for either providing high compression ratios at low and mid range end and reduced compression ratio at the high end so as to improve the overall engine performance throughout the entire speed and low ranges. These exhaust control valves also can be utilized for decompression purposes for assisting in starting.

Generally, the exhaust control valve controls the flow through and auxiliary or supplemental exhaust port of the engine. The type of exhaust control valve normally utilized is a valve that has a cylindrical configuration and, thus, has a relatively large effective surface area that is journaled for rotation in the engine body. These valves, however, are by their very nature disposed so that combustion products may accumulate on them. Therefore, it has been the practice to provide arrangements wherein the valves are cycled either before starting or upon the completion of running so as to remove these deposits from the valve and preclude vane sticking.

Although the self-cleaning operations are helpful, the removed particles tend to accumulate in the exhaust system and may again contaminate the valve when the engine is next run. In addition, in many types of vehicles, the exhaust control valve is operated by a remotely positioned servomotor. The servomotor is coupled to the exhaust control valve through a wire actuator for effecting its operation. As a result, the power available for rotating the valve is relatively small and the valves can easily become stuck.

It is, therefore, a principal object of this invention to provide an improved exhaust control valve for an engine.

It is a further object of this invention to provide an exhaust control valve for an engine that is configured so that, even if combustion particles accumulate on the exhaust valve, they will not interfere with its operation.

It is a further object of this invention to provide an improved exhaust control valve for an engine that has a configuration that minimizes the adverse affects and likelihood of combustion products accumulating on portions of the valve that would interfere with its operation.

It is a further object of this invention to provide an improved exhaust control valve for an engine that can be easily serviced.

SUMMARY OF THE INVENTION

This invention is adapted to be embodied in an internal combustion engine that comprises an engine body. An exhaust passage extends from a combustion chamber of the engine to the atmosphere at least, in part, through the engine body. A butterfly-type valve supported in the engine body on a shaft that passes through the exhaust passage for controlling for the flow therethrough.

DETAILED DESCRIPTION OF THE PREFERRED EMBODIMENTS OF THE INVENTION

Figure 1:
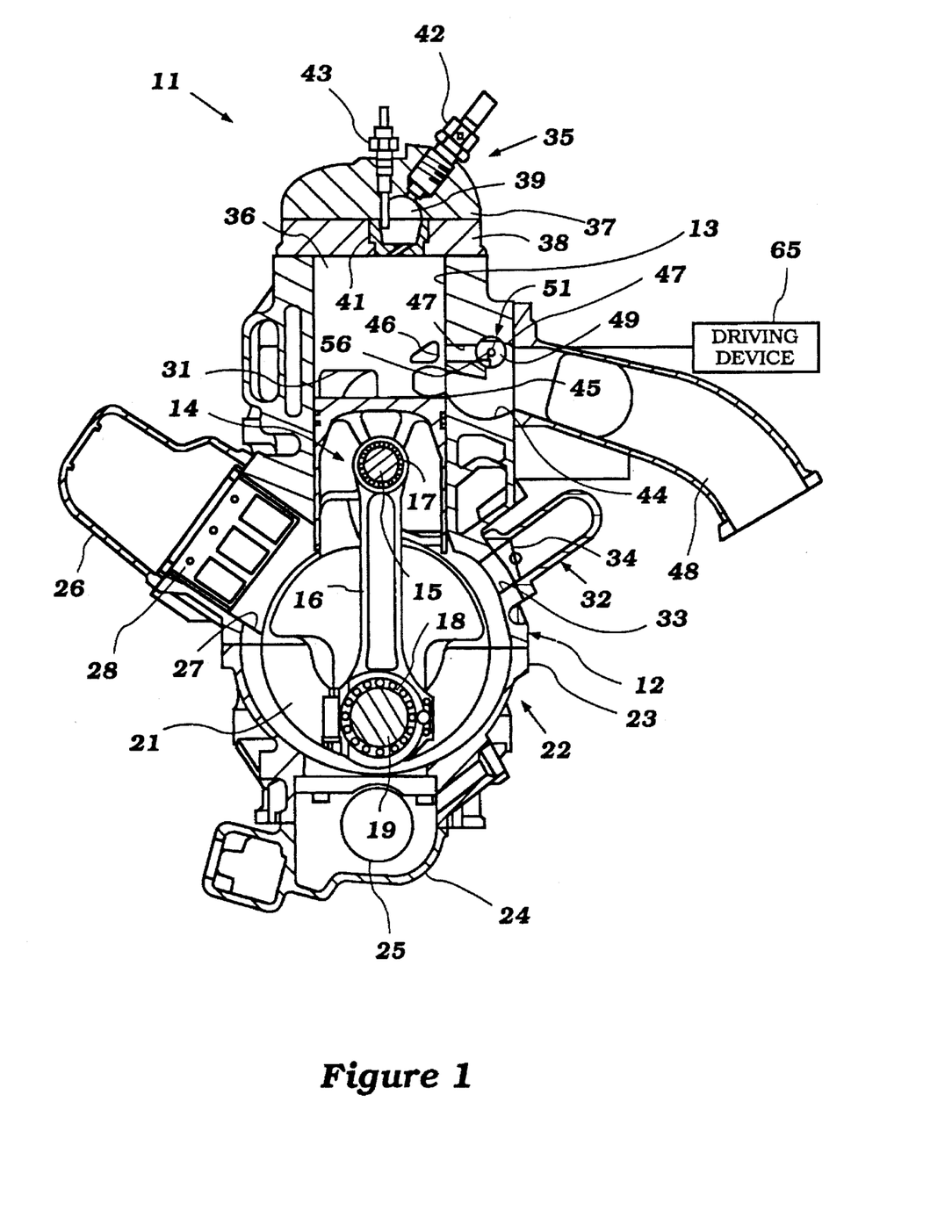
FIG. 1 is a cross-sectional view of a single cylinder of an internal combustion engine that is provided with an exhaust control valve constructed in accordance with an embodiment of the invention.
Figure 2:
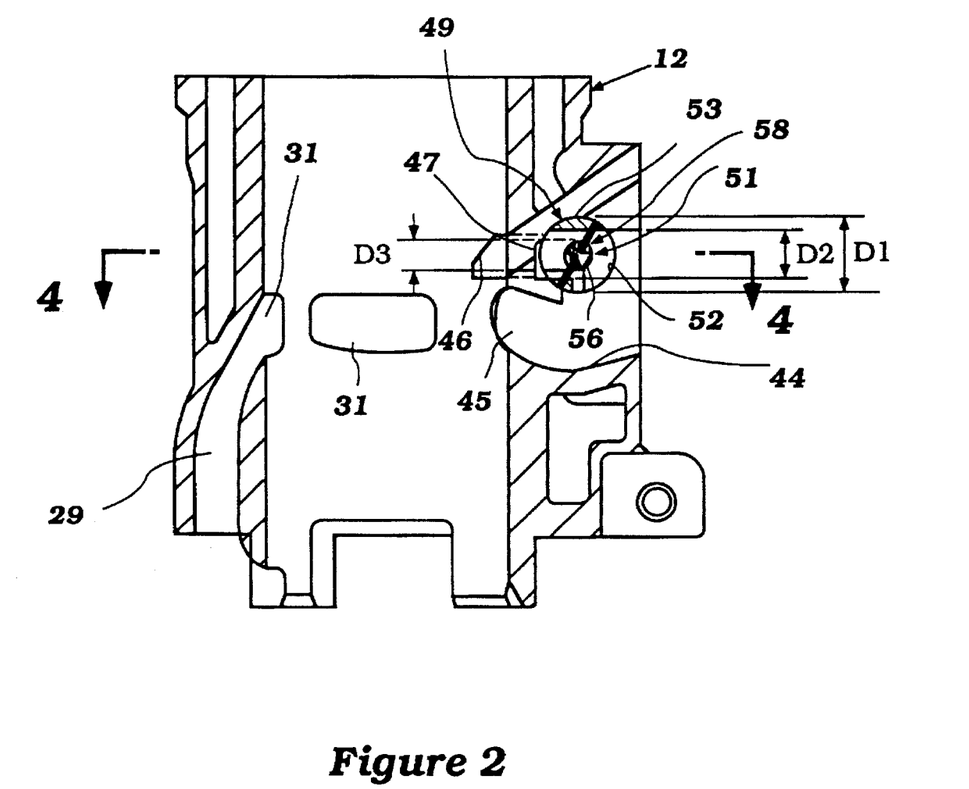
FIG. 2 is an enlarged cross-sectional view of the upper portion of the engine cylinder body.

Referring now in detail to the drawings and initially to FIGS. 1 and 2, an internal combustion engine constructed in accordance with an embodiment of the invention is indicated generally by the reference numeral 11. The engine 11 is a two-stroke crankcase compression-type diesel engine, though it will be readily apparent to those skilled in the art how the invention may be employed with engines of various other configurations.

The engine 11 is composed of an engine cylinder body 12 that is constructed of a suitable material, such as an aluminum alloy. A single cylinder bore 13 is formed within the body 12 and is shown in the cross-sectional view of FIG. 1 in which a piston 14 reciprocates. A piston pin 15 is mounted transversely within the piston 14 approximately mid-way down its skirt portion about which is rotatably journaled the small end of a connecting rod 16 by means of a needle bearing assembly 17. A further needle bearing assembly 18 journals the big end of the connecting rod 16 about the throw of a crankshaft that is indicated by the reference numeral 19 and is rotatably journaled within a crankcase chamber 21.

The crankcase chamber 21 is formed by the lower portion of the engine body 12 and a crankcase assembly 22 that is affixed to the lower surface of the engine body 12 by any suitable means. As has been noted, the engine 11 operates on a two-cycle crankcase compression principle. As is typical with such engines, the crankcase chamber 21 is sealed by any suitable means.

The crankcase assembly 22 consists of an upper crankcase member 23 which defines the lower portion of the crankcase chambers 21 and a lower crankcase member 24 that is affixed to the lower surface of the upper crankcase member 23 and serves as the oil pan for the engine 11.

As seen in FIG. 1, a counter shaft or balance shaft 24 may also be rotatably journaled within the lower crankcase member 24. The balance shaft 25 is driven by the crankshaft 19 to rotate about its own longitudinal axis in a direction opposite the direction of rotation of the crankshaft 19 so as to balance the engine 11 and, thus, reduce engine vibration.

A supply of atmospheric air is delivered to the crankcase chambers 21 by an intake manifold that is indicated by the reference numeral 26. The intake manifold 26 delivers the air to an intake port 27 that is disposed along one side of the engine body 12 and opens to the crankcase chamber 21. A reed-type check valve 28 is positioned in the intake port 27 and operates to preclude reverse air flow.

Figure 4:
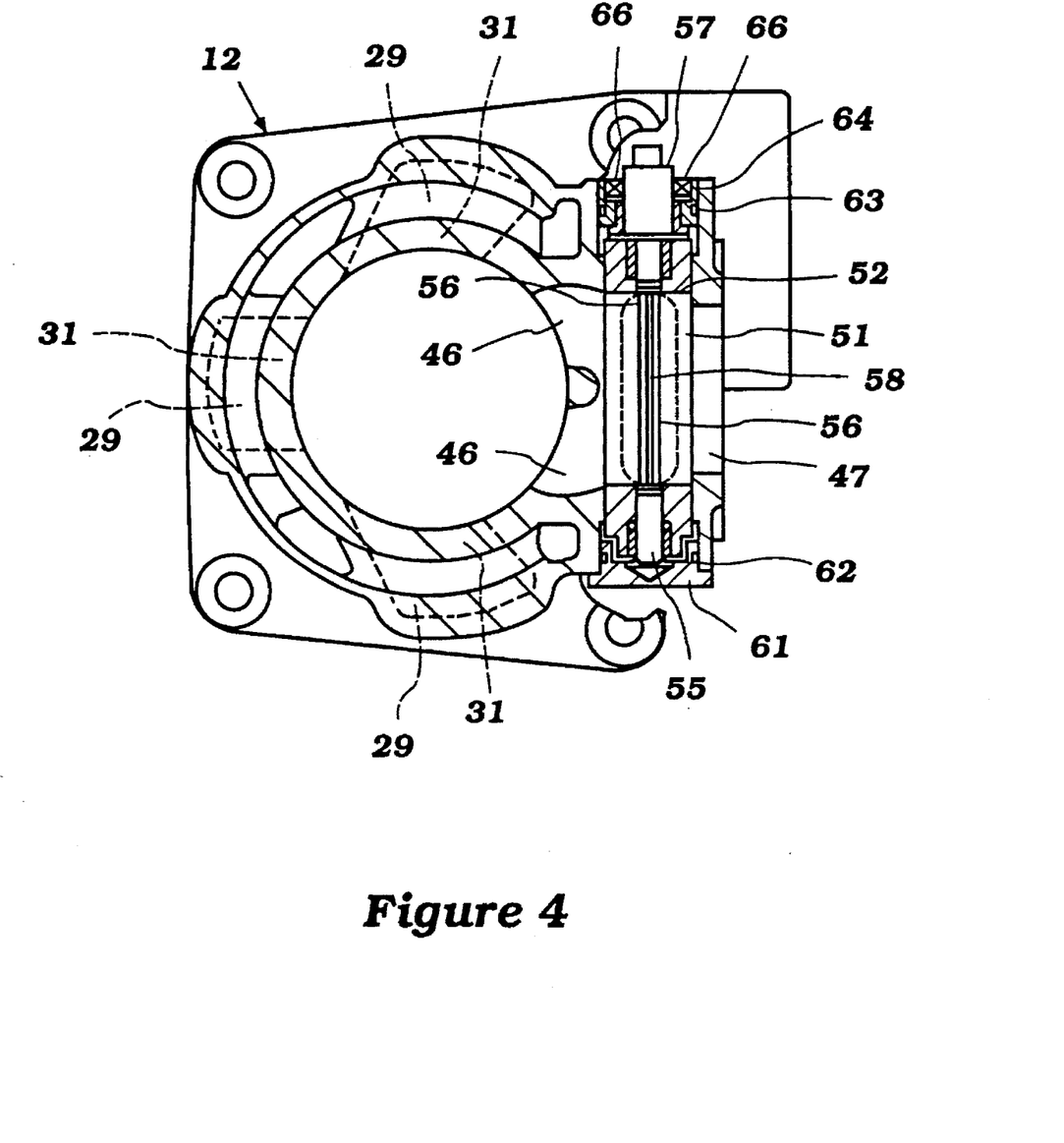
FIG. 4 is a cross-sectional view taken along line 4—4 of FIG. 2 that shows the exhaust control valve assembly in its installed position within the engine body.

As seen in FIGS. 2 and 4, scavenging passages are formed in the engine cylinder body 12 and indicated by the reference numeral 29. The scavenging passages 29 open at their lower ends to the crankcase chamber 21 and terminate at scavenge ports 31 that are formed in the bore 13 along the longitudinal axis of the bore 13.

If the engine 11 is of multiple cylinders a scavenge control assembly 32 may be disposed along the side of the engine body 12 opposite the intake manifold 26. The scavenge control assembly 32 opens to the crankcase chambers 21 through openings 33 formed in the engine body 12. Butterfly-type valves 34 are disposed in the scavenge control assembly 32 adjacent to the openings 33 and serve to regulate the flow of compressed atmospheric air through the scavenge control assembly 32 between crankcase chambers 21. In this manner, the scavenge control assembly 32 can be used to control the mount of scavenging for the internal combustion engine 11.

A cylinder head assembly is indicated by the reference numeral 35 and is affixed to the top surface of the engine body 12 in closing relation to the cylinder bore 13 in any known manner. The cylinder head 35 defines a recess which operates with the cylinder bore 13 and the head of the piston 14 to form a combustion chamber that is indicated by the reference numeral 36. The cylinder head assembly 35 consists of upper and lower head portions that are indicated by the reference numeral 37 and 38, respectively, and between which is formed a precombustion chamber 39. The precombustion chamber 39 communicates with the combustion chamber 36 by means of a passage or throat 41 formed in the lower head portion 38 of the cylinder head 35.

A fuel injector 42 is mounted in the upper head portion 37 of the cylinder head 35 atop the precombustion chamber 39 and is controlled by a control circuit (not shown) in a known manner. The fuel injector 42 receives a supply of fuel from a fuel tank that is not shown. Additionally, a glow plug 43 is mounted in the upper head portion 37 atop the precombustion chamber 39 adjacent to the fuel injector 42 and serves as an aid for engine ignition during engine starting and warm-up as is known in the art.

A main exhaust passage 44 is formed within the engine block 12 and terminates at a main exhaust port 45 which is disposed along the longitudinal length of the cylinder bore 13. With additional reference now to FIG. 4, a further pair of exhaust ports are indicated by the reference numeral 46 and are disposed above the main exhaust port 45. The exhaust ports 46 open to respective exhaust passages which merge to form a single exhaust passage 47 that opens at its downstream side to the main exhaust passage 44.

The main exhaust passage 44 terminates at an exhaust manifold that is indicated by the reference numeral 48. From the exhaust manifold 48, the exhaust gases are routed through an exhaust system (not shown) for purification and or silencing before being expelled to the atmosphere.

An exhaust control valve assembly is indicated by the reference numeral 49 and transversely positioned across the exhaust passage 47 immediately upstream of the point where the two exhaust passages 47 merge. The exhaust control valve assembly 49 controls the exhaust flow through the exhaust passage 47 so as to control the compression ratio of the engine and will be discussed in detail later.

The above-described diesel engine 11 operates in the following manner. Upward motion of the piston 14 draws atmospheric air from the intake manifold 26 into the crankcase chamber 21 past the reed valves 28. This air is compressed by the subsequent downstroke of the piston 14 until the continued downward motion of the piston 14 exposes the scavenging ports 31 to the combustion chamber 36. At this point, the compressed air enters the combustion chamber 36 through the scavenge passages 29. A portion of this air further enters the precombustion chamber 39 through the passage 41.

The ensuing compression stroke of the piston 14 then further compresses the air in the combustion chamber 36 and precombustion chamber 39 until at some point before top dead center (TDC) fuel is injected into the precombustion chamber 39 by the fuel injector 42 where it readily mixes with the compressed air and spontaneously ignites due to the high pressure within the precombustion chamber 39. This causes the mixture in the precombustion chamber 39, which consists both of burnt charge and unburnt fuel, to expand into the combustion chamber 36 where the unburnt fuel readily mixes with the compressed air to form a combustion mixture which ignites, forcing the piston 14 downwardly and, thus, driving the crankshaft 19.

Continued downward motion of the piston 14 exposes the exhaust portion 45 and 46 to the combustion chamber 36 at which point the combustion products enter the main exhaust passage 44 and upper exhaust passage 47, whose flow is regulated by the exhaust control valve 49.

It should be noted at this time that during engine start-up and warm-up, the precombustion chamber internal pressure may not be sufficiently high to initiate or maintain combustion. Under these circumstances, the glow plug 43 is used to ignite the mixture in the precombustion chamber 39.

The exhaust control valve will now be described. The exhaust control valve is used to control the compression ratio for the engine 11 by regulating the amount of exhaust gas flow through the exhaust passage 47. During high speed or high load engine operation, the exhaust control valve is opened which reduces the compression ratio of the engine 11 and improves the engine's high speed, high load performance without causing overheating. During medium or low speed or load operating conditions, the exhaust control valve may be partially or fully closed so as to restrict exhaust gas flow through the exhaust passage 47. This increases the compression ratio of the engine 11 and improves the engine's medium and low speed or load performance.

A problem exists with exhaust control valves of conventional design in that they are of a cylindrical configuration and, thus, have a large surface area that is exposed for at least some of the time to the combustion products present in the exhaust passage 47. These combustion products stick to the surface of the exhaust control valve and can eventually accumulate to such a degree as to cause the valve to stick inside the exhaust passage 47 and, thus, fail to function properly.

An embodiment of this invention utilizes an exhaust control valve configuration that minimizes the area of contract between the exhaust control valve and the exhaust passage inner surface and, thus, inhibits valve sticking.

Figure 3:
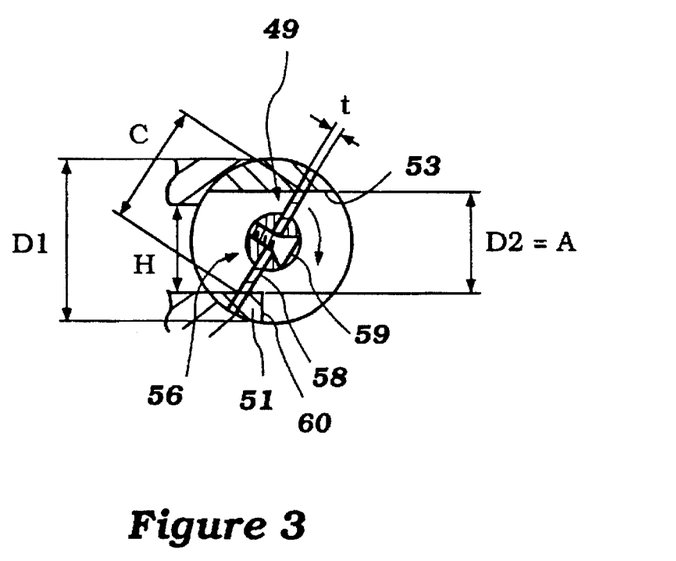
FIG. 3 is an enlarged cross-sectional view of the exhaust control valve assembly.
Figure 5:
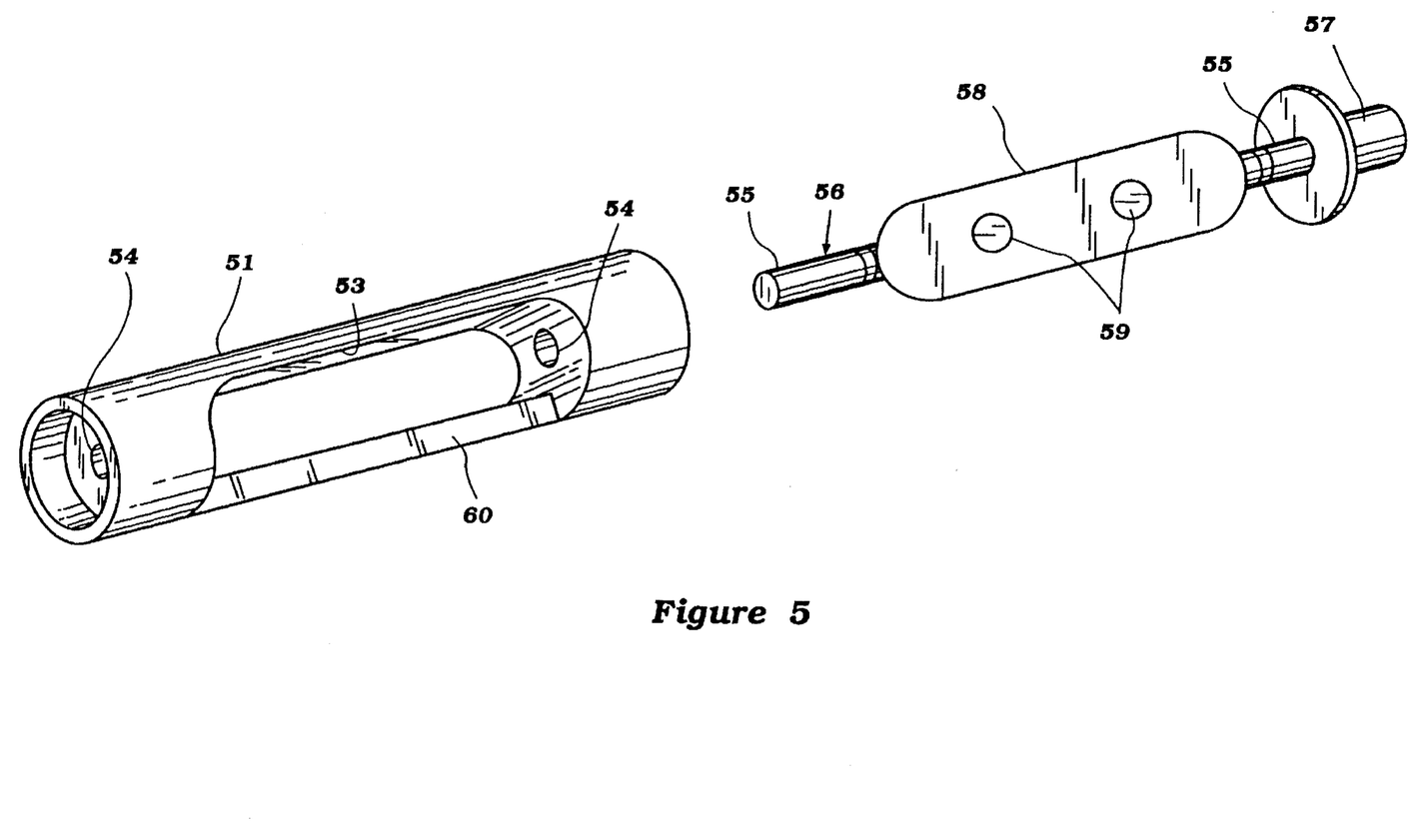
FIG. 5 is an exploded, perspective view of the exhaust control valve assembly with the exhaust valve removed from the assembly housing.
Figure 6:
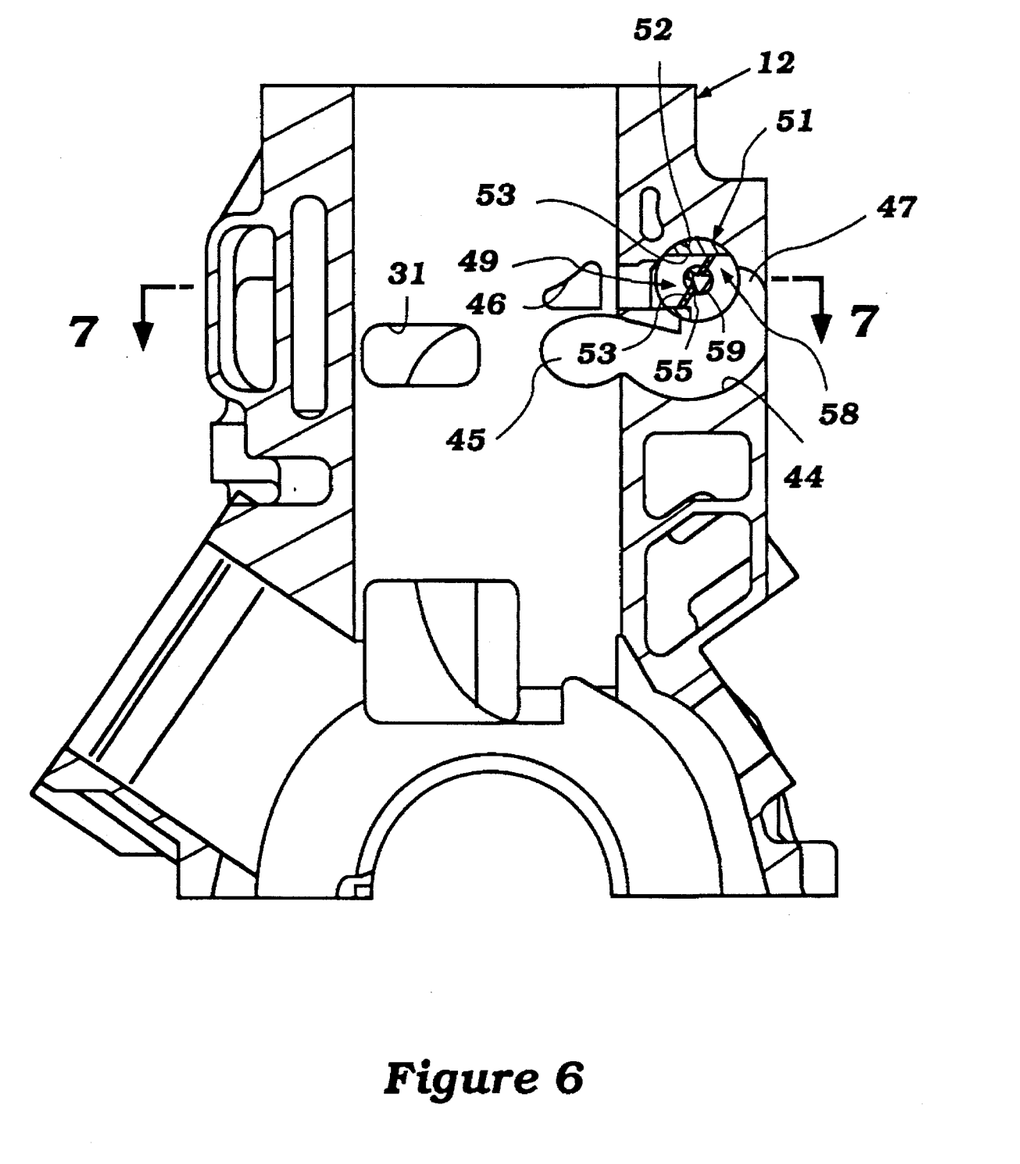
FIG. 6 is a cross-sectional view similar to FIG. 2 and shows a further embodiment of the invention.

Referring now primarily to FIGS. 3–5, the exhaust control valve assembly 49 is composed of a cylindrical exhaust valve body 51 that is disposed within a cylindrical bore 52 formed in the engine body 12 whose mid-portion extends through the exhaust passage 47. The cylindrical exhaust valve body 51 is constructed of a suitable material, such as iron or an iron or copper alloy, and has an oval-shaped flow passage 53 which extends from its upstream to its downstream side within the exhaust passage 47 and serves as a portion of the exhaust passage 47. As seen in FIGS. 2 and 3, the lesser diameter D2 of the flow passage 53 is equal to the height A of the exhaust passage 47 downstream of the exhaust control valve 49 and somewhat greater than the height H of the exhaust passages 47 upstream of the exhaust control valve 49. The flow passage diameter D2 is also significantly less than the outer diameter D1 of the cylindrical body 51.

As best seen in FIG. 5, the ends of the cylindrical body 51 have holes 54 formed at the longitudinal axis of the cylindrical body 51 in which are rotatably journaled the ends 55 of a valve shaft that is indicated by the reference numeral 56. The valve shaft 56 is constructed of iron or an iron or copper alloy and has a large base portion 57 affixed to one of its ends 55. As seen in FIG. 3, the diameter of the valve shaft D3 is relatively small, about half the lesser diameter D2 of the flow passage 53. This minimizes the surface area of the valve shaft 56 that contacts the surface of the holes 54 formed in the cylindrical body 51.

A butterfly-type valve is indicated by the reference numeral 58 and is affixed to the valve shaft 56 by screws 59. The butterfly valve 58 is constructed of a suitable material, such as iron or an iron or aluminum alloy. As seen in FIGS. 3 and 4, the butterfly valve 58 is oval shaped with a height or minor diameter C that is greater than the diameter D2 of the flow passage 53. Thus, in its fully closed position the butterfly valve 58 is disposed within the flow passage 53 at some angle from vertical. The butterfly valve 58 also has a thickness t that is relatively small so as to minimize the contact area between the butterfly valve 58 and the flow passage 53 when the butterfly valve 58 is in a closed position.

The exhaust control valve assembly 49 is assembled and installed in the cylinder body 12 in the following manner with reference to FIGS. 4 and 5. First, the valve shaft 56 is inserted into the cylinder body 51 through the holes 54 until the base portion 57 contacts the end of the body 51. Then the butterfly valve 58 is inserted into the cylindrical body 51 through the downstream opening of the flow passage 53 which has been enlarged by a cut out 60 in order to allow the butterfly valve 58 to be affixed to the valve shaft 56. The screws 59 are inserted through the butterfly valve 58 into threaded holes formed in the valve shaft 56 and tightened so as to fix the butterfly valve 58 to the valve shaft 56.

The above assembly is then inserted into the cylindrical bore 52 formed in the engine body 12. As seen in FIG. 4, the lower end of the exhaust valve assembly 49 is constrained from axial motion by a cap 61 with an O-ring seal 62 while the upper or base end is axially constrained by a retainer 63 that is held in position by an end plate (not shown). An O-ring seal 64 seals this end of the valve assembly 49. The base 57 of the valve shaft 56 extends beyond the retainer 63 and is connected to a driving device 65 (FIG. 1) such as a servomotor with a wire actuator which controls the angular orientation of the butterfly valve 58 within the flow passage 53. A seal 66 surrounds the base 57 above the retainer 63 so as to prevent exhaust gas flow through the cylindrical bore 52.

The above configured exhaust control valve assembly 49 greatly reduces the possibility of the valve 58 sticking to the surface of the flow passage 53 since the contact area between the butterfly valve and shaft 58 and 56 and the surface of the flow passage 53 is minimized. When the valve 58 is operating in an open position, the only contact area is between the holes 54 in the side of the flow passage 53 and the valve shaft 56. Since the diameter D3 of the valve shaft 56 is small, the surface area between the two components upon which combustion products may build up is insufficient to adversely affect exhaust control valve operation.

In the situation where a valve 58 in a fully closed position following high speed, high combustion content engine operation is subsequently opened again, the contact area between the valve 58 and passage 53 is minimized due to the small valve thickness t and, thus, the power from the driving device 65 is more than sufficient to overcome any sticking resistance from combustion products deposited about the contact area defined by the valve thickness t. Thus, the above exhaust control valve assembly 49 precludes valve sticking induced by the presence of combustion products and also provides an assembly that is readily removable from the engine body 12 whenever exhaust control valve servicing is required.

Figure 7:
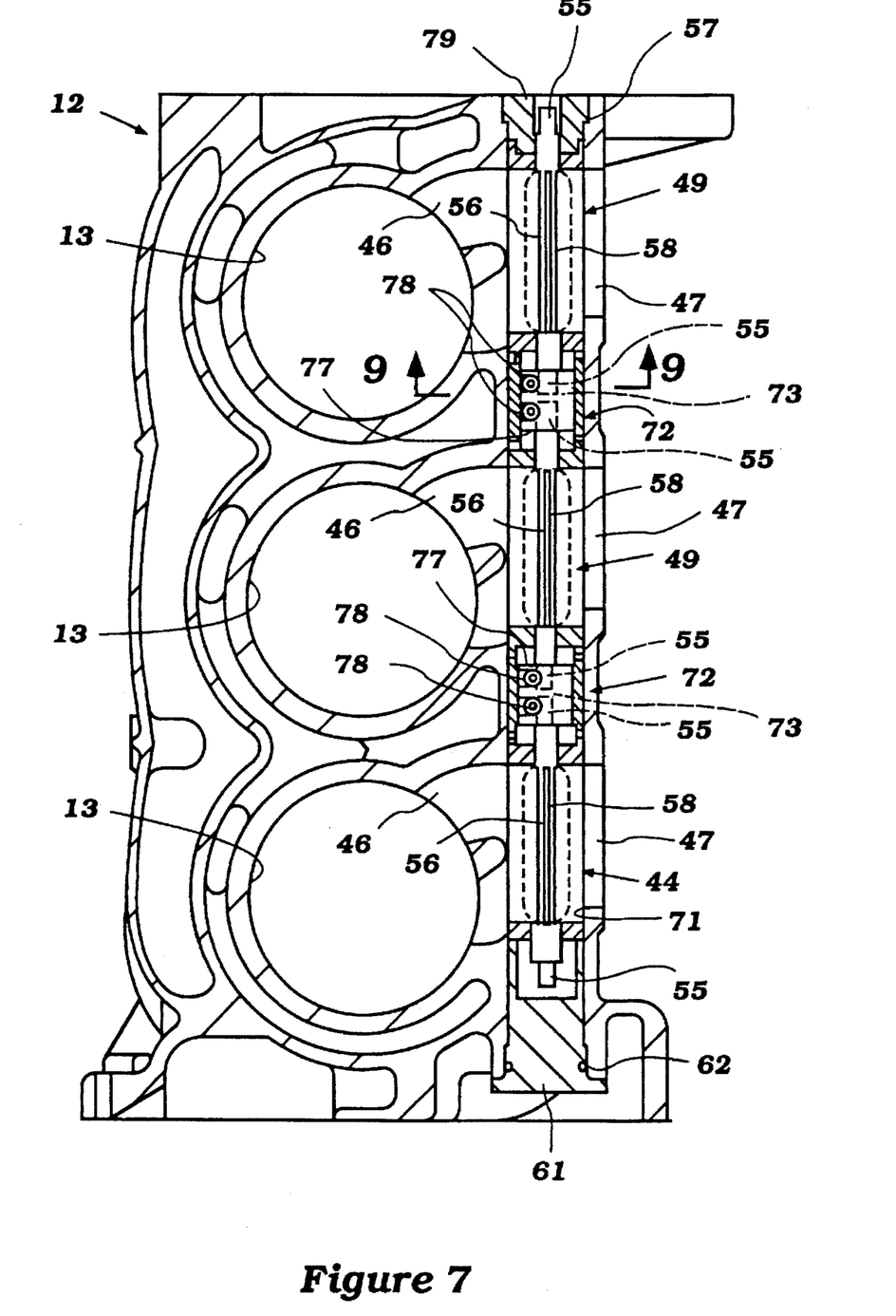
FIG. 7 is a cross-sectional view taken along line 7—7 of FIG. 6 and illustrates the exhaust control valve arrangement for multiple cylinders of the internal combustion engine.
Figure 8:
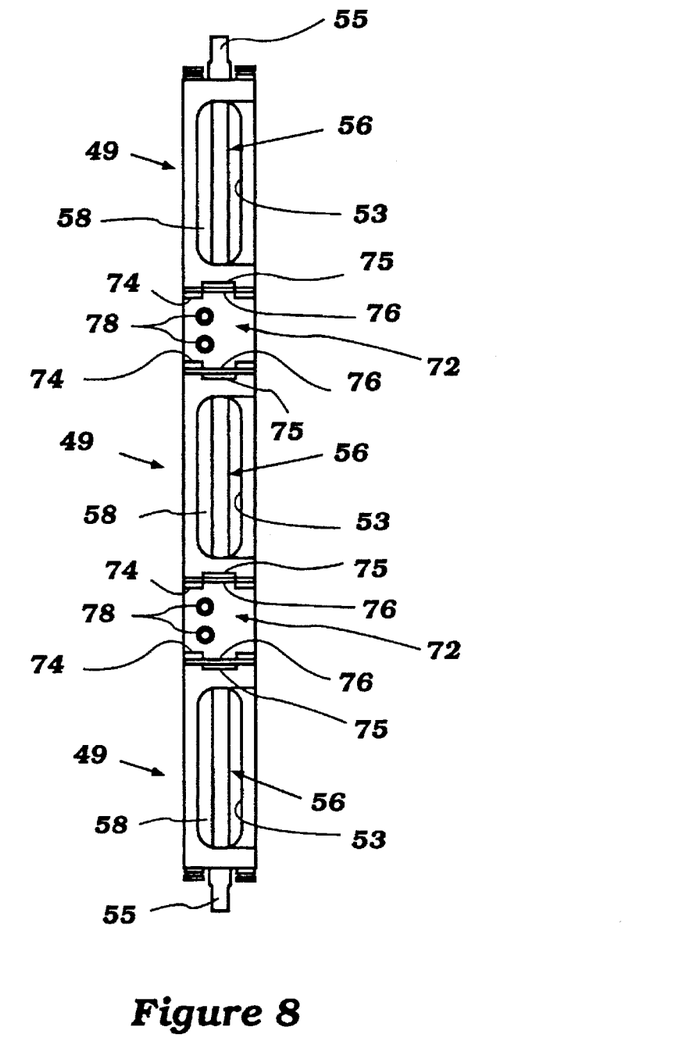
FIG. 8 is a top plan view of the exhaust control valve arrangement of FIG. 7.

While the invention is thus far described in relation to a single cylinder engine 11, FIGS. 6–9 illustrate a means by which the invention may be applied to a three cylinder internal combustion engine 11. As best seen in FIG. 7, a single cylindrical bore 71 extends transversely across the engine body or block 12 in which are positioned three exhaust control valve assemblies 49, each disposed in association with a respective cylinder bore 13 and exhaust passage 47. The ends 55 of each of the valve shafts 56 extend beyond the ends of their respective cylindrical body housings 51. Adjacent internal ends 55 of the valve shafts 56 extend into a pair of shaft coupling mechanisms that are indicated by the reference numeral 72 and disposed in the cylindrical bore 52 between each of the exhaust control valve assemblies 49.

Figure 9:
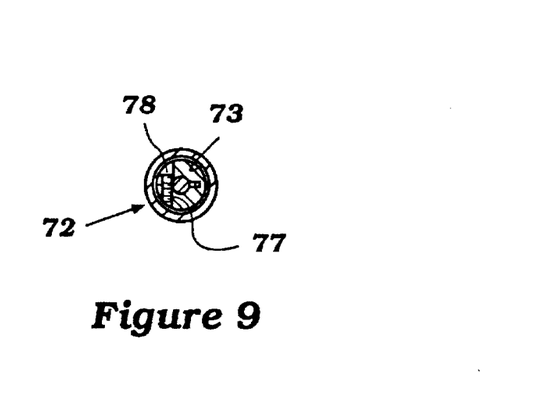
FIG. 9 is a cross-sectional view taken along line 9—9 of FIG. 7 and illustrates a coupling mechanism for the exhaust valve shafts.

Each coupling mechanism 72 consists of a cover 73 at whose upper and lower ends are formed projections 74. These projections 74 engage recesses 75 that are formed in the adjacent ends of the cylindrical body housing 51. Snap rings 76 are positioned at both ends of the cover 73 and maintain the engagement between the cover 73 and the cylindrical body housings 51. A coupling member 77 is disposed underneath the cover 73 and engages both the adjacent ends 55 of the valve shafts 56. This engagement is secured by engagement screws 78 which rigidly affix the ends 55 of the valve shafts 56 to the coupling member 77 and thus couples together the rotations of the valve shafts 56.

As in the previous embodiment, the lower end of the cylindrical bore 52 is constrained and sealed by the cap 61 and the O-ring seal 62. The upper end of the bore 52, however, is constrained by a different method than previous, since the upper end 55 of the upper valve shaft 56 no longer includes an enlarged base portion 57. As seen in FIG. 7, the upper end 55 of the upper valve shaft 56 extends through an opening formed in a retainer 79 which holds the exhaust control valve mechanisms 49 within the cylindrical bore 52. Though not shown in the figure, the exposed upper end 55 of the valve shaft 56 is then connected by any suitable means to the driving device 65.

Thus, the above-described exhaust control valve assemblies 49 continue to preclude exhaust valve sticking while providing an integrated assembly that may be readily removed for servicing from the engine 11.

Figure 10:
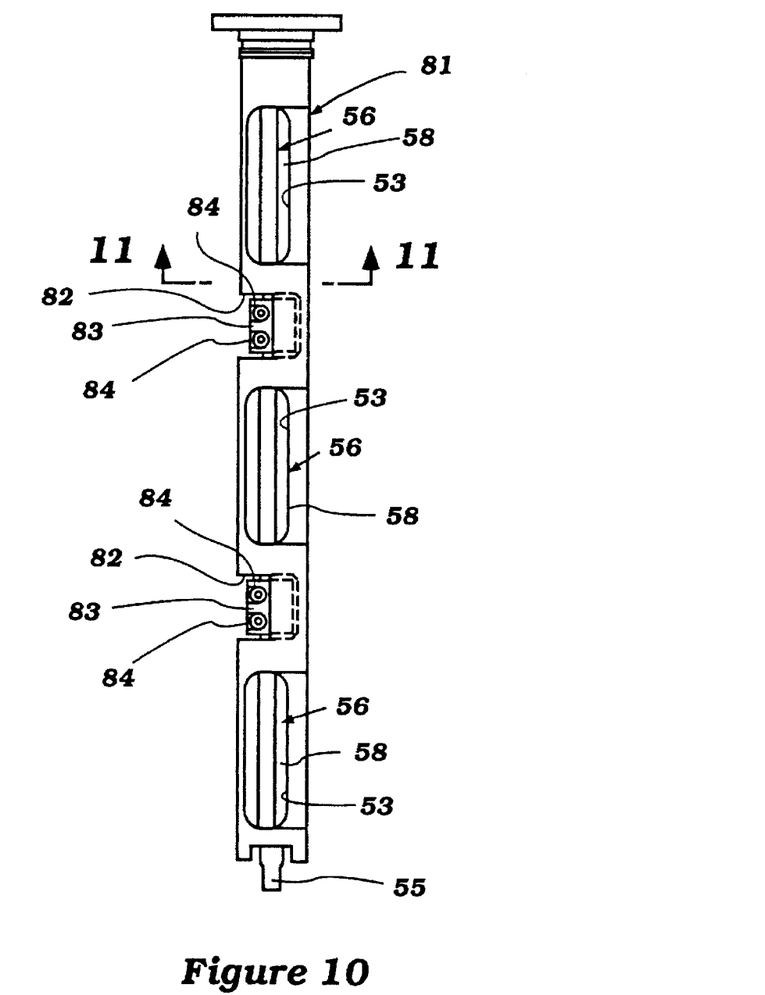
FIG. 10 is a top plan view similar to FIG. 8 and shows a further exhaust control valve embodiment.
Figure 11:
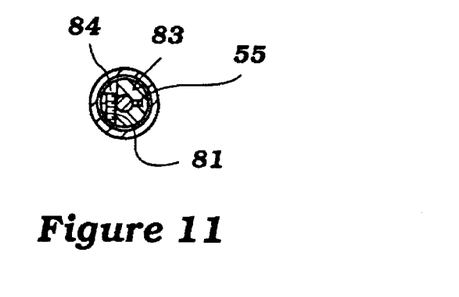
FIG. 11 is a cross-sectional view taken along line 11—11 of FIG. 10 and illustrates the coupling mechanism for the exhaust control valve shafts.

FIGS. 10 and 11 illustrate a further means by which the individual exhaust control valve assemblies 49 may be coupled together to form a single unit. A single cylindrical exhaust valve body is indicated by the reference numeral 81 in which are disposed three flow passages 53 with a butterfly valve 58 and shaft 56 positioned in each of the flow passages 53. A pair of recesses 82 are formed in the cylindrical body 81 into which extend the ends 55 of adjacent valve shafts 56. These ends 55 are affixed to a coupling member 83 by means of screws 84. Thus, each of the butterfly valves 58 are once again coupled together in a simple manner and are driven in unison by the driving device 65.

It should be noted that the above-described embodiment may be further simplified by utilizing a single valve shaft 56 on which three butterfly valves 58 are mounted. This would eliminate the need for coupling mechanisms and thus further reduce the cost of the exhaust control valve assemblies 49.

Figure 12:
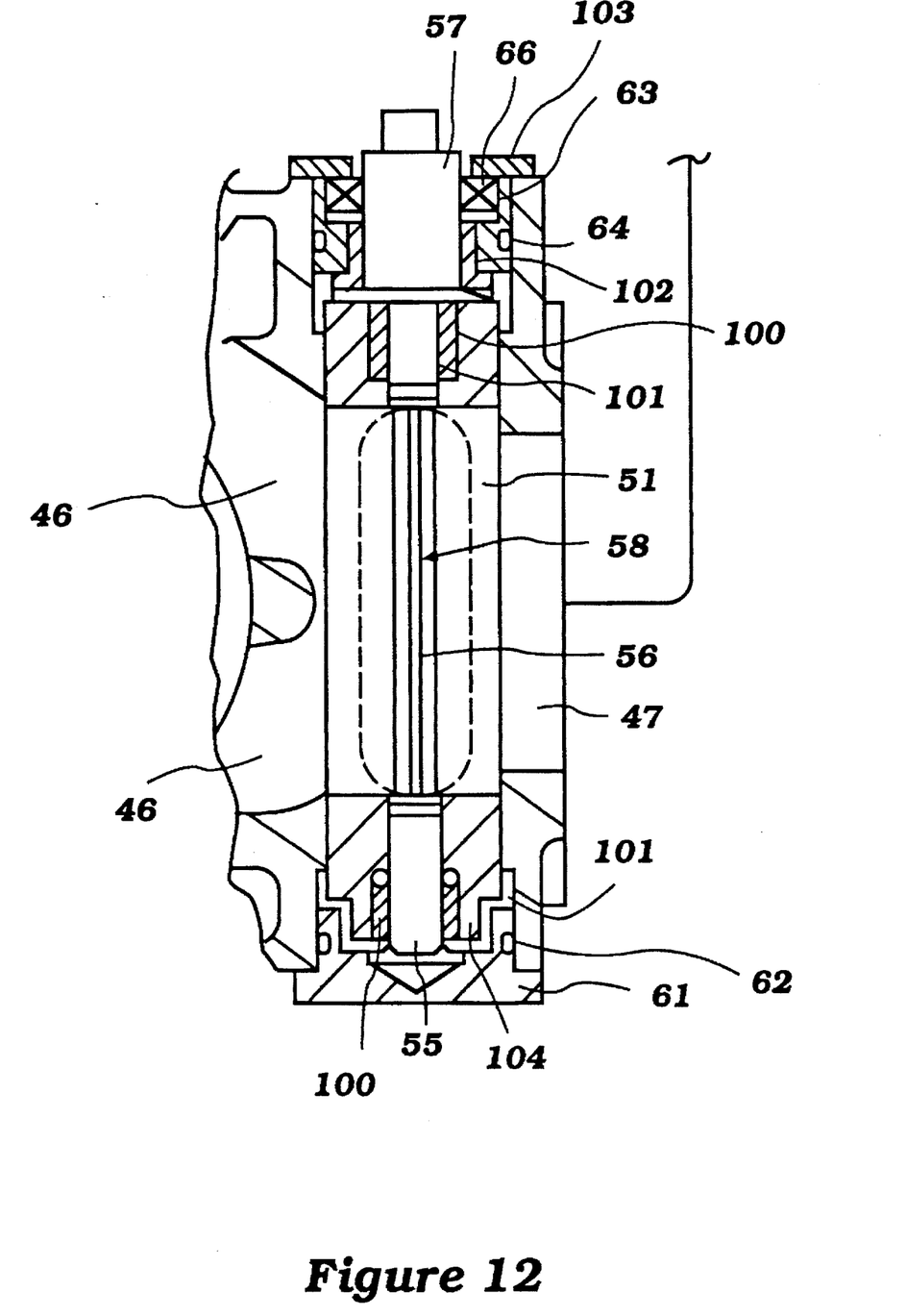
FIG. 12 is an enlarged cross-sectional view, in part similar to FIGS. 4 and 7, and shows a further embodiment of the invention.

FIG. 12 shows another embodiment of the invention which is similar to those embodiments already described. Where this embodiment is the same as those previously described embodiments, common components have been indicated by like reference numerals and will not be described again. This embodiment has the advantage of using some common parts and it will be seen that the valve assembly is placed into the engine through a bore which is counterbored at its opposite end so as to receive a pair of dry bushings 100 which journal the shaft portions 55. Carbon sealing rings 101 are provided at the ends of the dry bushings for sealing purposes.

At that end where the valve shaft 57 is connected to the servo motor, it is supported by a further bushing 102 which is held in place by a closure plate 103.

At thrust washer 104 is interposed between the stopper plate 61 and the bushing at the opposite ends so as to complete the axial location of the valve shaft 56.

It should be readily apparent that the above described embodiments provide an exhaust control valve that inhibits valve sticking induced by combustion products accumulating on the surface of the valve and also provides an assembly that can be easily removed from the engine should servicing be required. Of course, the foregoing description is that of preferred embodiments of the invention, and various changes and modifications may be made without departing from the spirit and scope of the invention, as defined by the appended claims.

What is claimed is:

1. An internal combustion engine comprised of an engine body, an exhaust passage extending from an exhaust port communicating said exhaust passage with a combustion chamber of said engine and the atmosphere at least, in part, through said engine body, said exhaust port being opened and closed by an element operating in said combustion chamber, and a butterfly-type valve supported in said engine body on a valve shaft passing transversely through said exhaust passage for controlling the flow through said exhaust port for varying the effective compression ratio of said engine.

2. An internal combustion engine as set forth in claim 1, wherein the portion of the exhaust passage through which the valve shaft passes has an effective diameter which is less than the effective diameter of the butterfly-type valve.

3. An internal combustion engine as set forth in claim 2, wherein the exhaust passage portion is oval in configuration and the minor diameter portion of the oval is of a diameter smaller than the corresponding diameter of the butterfly-type valve.

4. An internal combustion engine as set forth in claim 3, wherein the thickness of the butterfly-type valve is less than the diameter of the valve shaft.

5. An internal combustion engine as set forth in claim 4, wherein the valve shaft diameter is substantially less than the effective diameter of the butterfly-type valve.

6. An internal combustion engine as set forth in claim 1, wherein the exhaust passage portion is oval in configuration and the minor diameter portion of the oval is of a diameter smaller than the corresponding diameter of the butterfly-type valve.

7. An internal combustion engine as set forth in claim 6, wherein the thickness of the butterfly-type valve is less than the diameter of the valve shaft.

8. An internal combustion engine as set forth in claim 7, wherein the valve shaft diameter is substantially less than the effective diameter of the butterfly-type valve.

9. An internal combustion engine comprised of an engine body, an exhaust passage extending from a combustion chamber of said engine to the atmosphere at least, in part, through said engine body, as set forth in claim 1, further including a generally cylindrical exhaust valve body extending into said engine body and fixed in a cylindrical bore formed in said engine body, said exhaust valve body having a flow passage extending therethrough which forms at least, in part, said exhaust passage, and a valve shaft and said butterfly-type valve rotatably journaled in said exhaust valve body with said butterfly-type valve controlling the flow through said exhaust valve body exhaust passage.

10. An internal combustion engine as set forth in claim 9, wherein the diameter of the exhaust valve body is substantially greater than the effective diameter of the valve body passage.

11. An internal combustion engine as set forth in claim 10, wherein the valve body exhaust passage is of an effective diameter that is at least as large as the effective diameter of portion of the exhaust passage formed in the engine body adjacent the exhaust valve housing.

12. An internal combustion engine as set forth in claim 11, wherein the portion of the exhaust passage through which the valve shaft passes has an effective diameter which is less than the effective diameter of the butterfly-type valve.

13. An internal combustion engine as set forth in claim 12, wherein the exhaust passage portion is oval in configuration and the minor diameter portion of the oval is of a diameter smaller than the corresponding diameter of the butterfly-type valve.

14. An internal combustion engine as set forth in claim 13, wherein the thickness of the butterfly-type valve is less than the diameter of the valve shaft.

15. An internal combustion engine as set forth in claim 14, wherein the valve shaft diameter is substantially less than the effective diameter of the butterfly-type valve.

16. An internal combustion engine as set forth in claim 11, wherein the exhaust passage portion is oval in configuration and the minor diameter portion of the oval is of a diameter smaller than the corresponding diameter of the butterfly-type valve.

17. An internal combustion engine as set forth in claim 16, wherein the thickness of the butterfly-type valve is less than the diameter of the valve shaft.

18. An internal combustion engine as set forth in claim 17, wherein the valve shaft diameter is substantially less than the effective diameter of the butterfly-type valve.

19. An internal combustion engine as set forth in claim 9, wherein the engine body comprises a cylinder block having a plurality of cylinder bores each being served by a respective exhaust passage, there being provided a butterfly-type valve for each of said exhaust passages each supported in an exhaust valve housing.

20. An internal combustion engine as set forth in claim 19, wherein there are provided a plurality of exhaust valve housings, one for each cylinder bore and wherein the exhaust valve housings are rigidly connected to each other.

* * * * *